United States Patent [19]
Obitz

[11] Patent Number: 5,148,998
[45] Date of Patent: Sep. 22, 1992

[54] APPARATUS FOR THE TREATMENT OF MILLING PRODUCTS

[76] Inventor: Lars Obitz, Isterberget 3, Vaxholm, Sweden S-18500

[21] Appl. No.: 694,232

[22] Filed: May 1, 1991

[30] Foreign Application Priority Data

May 4, 1990 [SE] Sweden .................. 9001612-2

[51] Int. Cl.⁵ ............................................. B02C 1/08
[52] U.S. Cl. ..................................... 241/241; 162/261
[58] Field of Search .................. 241/239, 241, 242; 162/23, 261

[56] References Cited

U.S. PATENT DOCUMENTS

| | | | |
|---|---|---|---|
| 4,317,701 | 3/1982 | Pfalzer et al. | 162/261 X |
| 4,615,490 | 10/1986 | Goldhammer | 241/241 X |
| 4,660,777 | 4/1987 | Schaefer et al. | 241/241 X |

Primary Examiner—Douglas D. Watts
Attorney, Agent, or Firm—Dowell & Dowell

[57] ABSTRACT

Apparatus for treating milling products to recover steam energy which includes a rotor having at least one pocket therein which is rotatably mounted within a housing so that the pocket is sequentially brought into open communication with a material inlet, milling product discharge opening, and steam outlet and wherein milling product received into the pocket when aligned with the material inlet is discharged through the milling product discharge opening and the steam separated therefrom thereafter discharged through the steam outlet. The discharged milling product is subsequently conveyed through a steam tight discharge device.

23 Claims, 5 Drawing Sheets

APPARATUS FOR THE TREATMENT OF MILLING PRODUCTS

BACKGROUND OF THE INVENTION

1. Field of the Invention

The present invention relates to apparatus for the treatment of milling products in accordance with the preamble of claim 1.

2. History of the Related Art

Large quantities of steam are generated when grinding lignocellulosic material, for instance when defibering woodchips to pulp form, where large quantities of energy are supplied to the grinding apparatus or defibrator. The energy content of the steam is considerable and must be recovered in order to improve the economy of the pulp manufacturing plants. The steam is normally separated from the pulp downstream of the defibering apparatus, in so-called cyclones which operate on separation by centrifugation principles. These apparatus, however, often become blocked or clogged as a result of moist pulp adhering to the walls and conduits of the cyclone and thereby form agglomerates which continue to grow until they finally cause total interruption of the separation treatment, thereby necessitating a halt in production until the separator is cleaned.

For further treatment of the pulp, it is also normal to install downstream of the defibrator, a grinding apparatus refiner, in which the pulp is finely ground prior to being introduced into the steam separating cyclone.

OBJECT OF THE INVENTION

The object of the present invention is to provide apparatus for treating pulp downstream of the defibering stage with which the aforesaid problems are avoided, such as to reduce the number of production stoppages to a minimum.

Another object is to provide apparatus with which pulp can be subsequently treated in a manner which will enable refinement of the pulp and separation of the steam to recover its energy content to be carried in one and the same machine.

These and other objects of the invention are achieved by means of the inventive apparatus having the characteristic features set forth in the following claims.

BRIEF DESCRIPTION OF THE DRAWINGS

The invention will now be described in more detail with reference to preferred exemplifying embodiments thereof illustrated in the accompanying drawings, in which.

DESCRIPTION OF THE PREFERRED EMBODIMENTS

Figure 1:
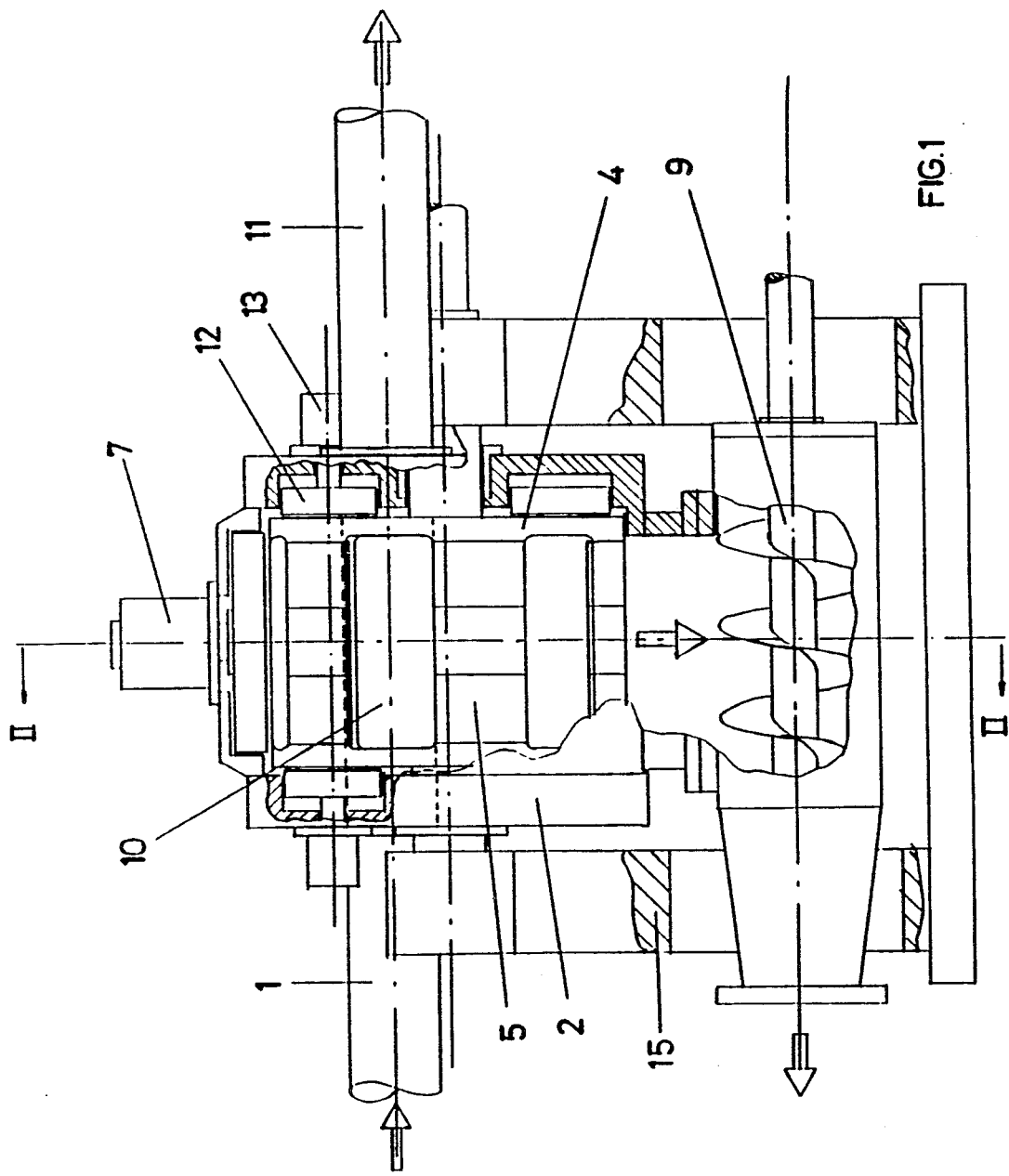
FIG. 1 is a side view, partly in section, of an apparatus constructed in accordance with the invention.

The illustrated apparatus for treating milling products includes a housing 14 in wich a rotor 4 is rotatably mounted in a bearing housing mounted on a housing stand 15. The rotor is driven by a drive motor (not shown) in a known manner in the rotational direction indicated by the arrow in FIG. 2. Connected to the left end-wall 2 of the housing 14 is a delivery conduit 1 through which milling product obtained in an earlier treatment stage, such as a defibrator (not shown), is blown through an opening in the rotor housing 14 and into a pocket 3 provided in the said rotor and extending axially therein. The rotor 4 includes a number of such pockets 3, in the illustrated embodiment six pockets. As illustrated in FIG. 1, these pockets 3 may pass through the rotor 4, or may have the form of blind pockets, i.e. terminate short in the rotor 4, as illustrated in FIG. 3. When the pockets 3 pass completely through the rotor, sealing rings 12 are mounted on both sides of the rotor in the end-walls 2 of the housing. These sealing rings seal between the rotor and the respective endwalls of the housing and are provided with adjustment devices 13 by means of which the sealing devices 12 can be adjusted positionally in an axial direction, to adjust the clearance or leakage between end-wall 2 and rotor 4. When the pockets 3 do not pass completely through the rotor, as in the case of the FIG. 3 embodiment, a sealing ring 12 is only required in the housing end-wall 2 onto which the pockets open.

Figure 2:
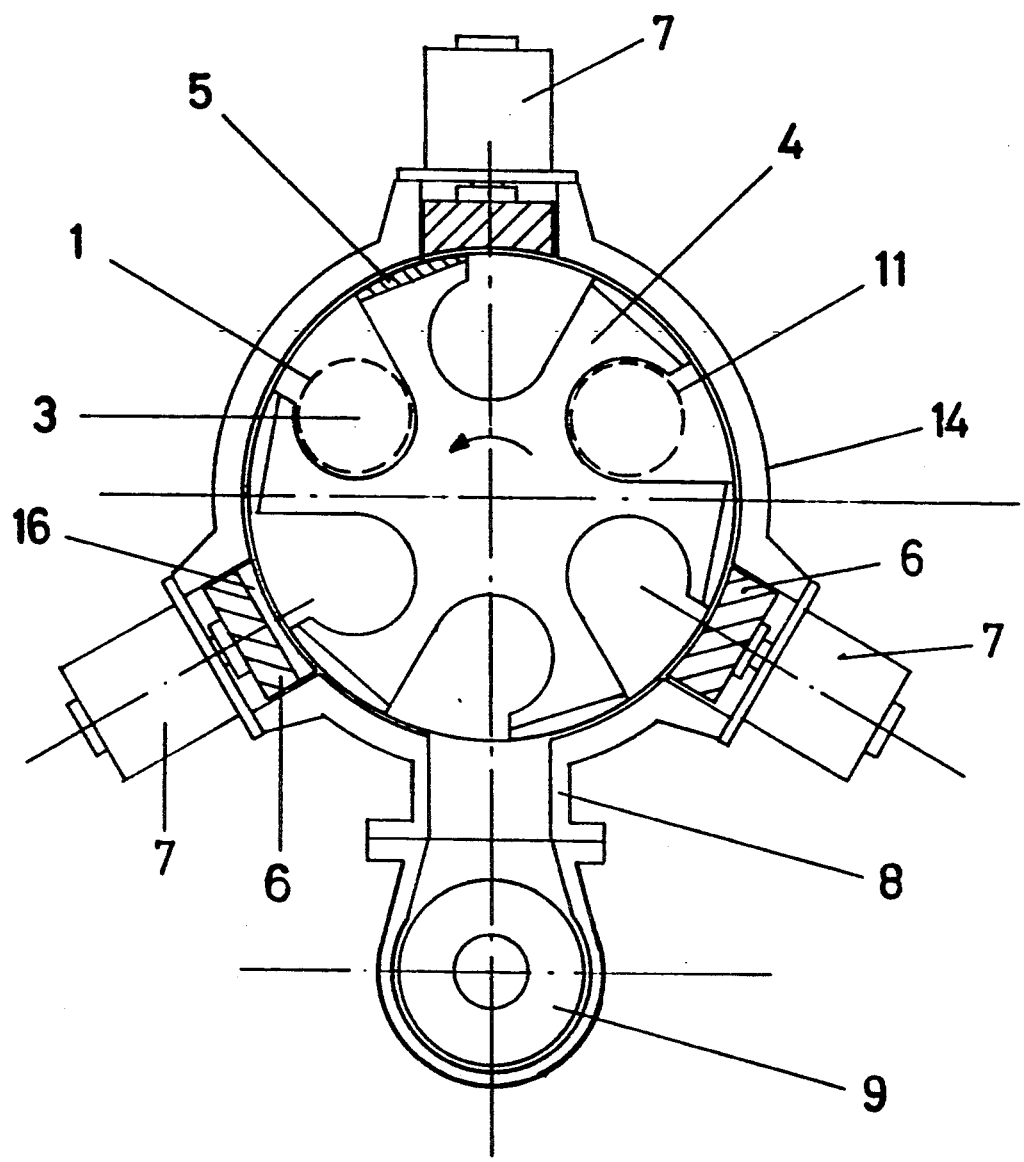
FIG. 2 is a sectional view taken on the line II—II in FIG. 1.
Figure 3:
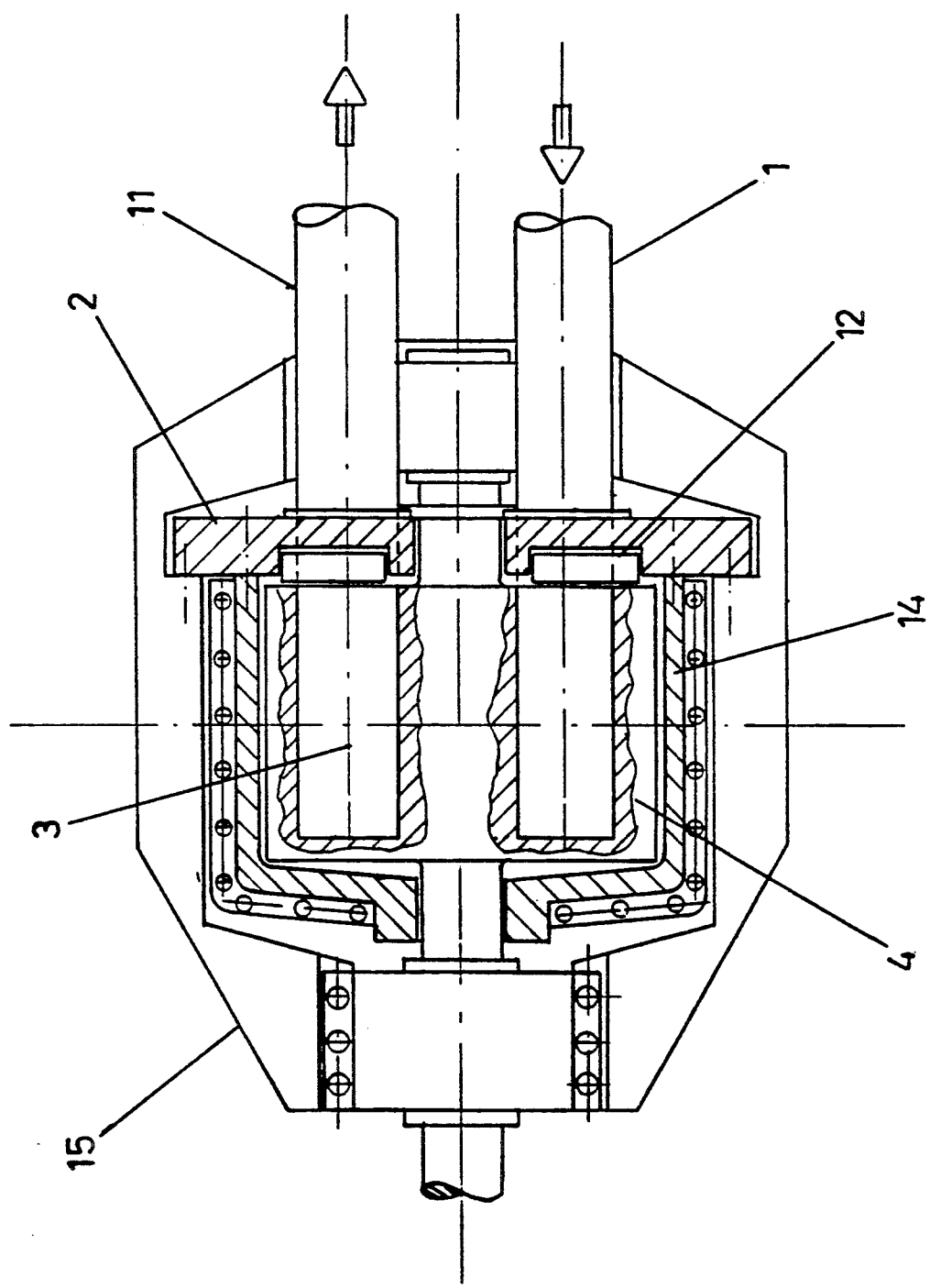
FIG. 3 is a horizontal sectional view of a modified embodiment of the inventive apparatus.

In the illustrated embodiment, the pockets 3 are cylindrical and have a diameter which corresponds substantially to the diameter of the inlet 1 and the pockets are provided with a radially-open discharge opening 10 which, upon continued rotation of the rotor 4 from the inlet 1 in the direction illustrated in FIG. 2 is caused to coincide with or register with a corresponding opening 8 in the housing 14. Opening 8 connects with the bottom of the rotor housing and extends to a pulp discharge device mounted in communication therewith. In the illustrated embodiment, this discharge arrangement comprises a plug screw 9 which functions to transport the material while forming a steam-tight pulp plug of a kind known in this art. As the rotor continues to rotate, the pocket 3 communicates with a discharge conduit 11, which is cylindrical and the diameter of which corresponds substantially with the diameter of the pocket 3. The steam transported with the milling product to the grinder housing 14 and the steam generated during treatment of the material in the machine, as described herebelow, is blown out through the conduit 11 and the energy content of the steam recovered in a known manner.

As illustrated in FIG. 2, plates 5 may be mounted between adjacent pockets 3, on the surfaces located between the radial openings 10. These plates may either consist of wear plates or sealing plates, or of grinding elements or grinding members of appropriate construction for further treating the milling product delivered through the inlet 1, for instance by further refining said material. Disposed at suitable locations in the housing are sections, in the FIG. 2 embodiment three such sections, in which pressure-exerting blocks 6 are mounted. The blocks 6 are moved radially by means of hydraulic devices 7 or the like and function either as sealing surfaces between the inlet 1 and the outlets 8 and 11 or when the rotor is provided with grinder elements, as illustrated at 5, corresponding grinding members 16 may be provided function to treat the milling product or fiber material during its transport from inlet to outlet.

As before mentioned, the pockets 3 of the FIG. 1 embodiment extend through the rotor 4, and the inlet 1, which opens axially in the end-wall plate 2 of the housing 14, and the outlet 11 are angularly displaced in relation to one another, as shown in FIG. 2, and also in relation to the pulp-outlet opening 8. The inlet 1, the pulp outlet opening 8 and the steam outlet 11 are thus positioned in that order in relation to the rotational direction of the rotor 4. Also, as shown in FIG. 2, it should be noted that the milling product outlet opening (8) is located radially outwardly at a greater distance from the center axis of the rotor than is the steam outlet (11).

The pockets 3 in the FIG. 3 embodiment do not pass through the rotor 4 and consequently the inlet 1 and the outlet 11 are located on the same side of the housing 14, although they are also angularly positioned in relation to one another and to the pulp outlet 8 as seen in the rotational direction of the rotor.

When the illustrated and described apparatus is in operation, the incoming milling product, such as fiber material, is blown-in through the inlet conduit 1 which, via the end-wall 2 of the rotor housing 14, is connected to that pocket 3 in the rotor 4 which is located at that moment in time in front of the exit orifice of the conduit 1. Due to rotation of the rotor 4, the fiber material is blown out against the periphery of the radial opening 10 of the pocket, at the same time as said fiber material is transported by the rotor 4 towards the outlet opening 8, which communicates with the bottom of the rotor housing 14. When the blades of the rotor 4 are provided with grinder elements 5 between the openings, the fibre material will be worked in the gap defined between respective grinder elements 5 mounted on the rotor and the adjustable grinder element 16 mounted on the radially movable blocks 6, during transportation of the fiber material to the opening 8. When the opening 10 in the pocket 3 is in register with the opening 8, the fiber material will drop onto the underlying plug screw 9, which conveys the fiber material or pulp to a receiving station, via the steam-tight pulp plug formed by the material itself in a manner well known in this art.

The steam generated during earlier processing of the material or used to transport the material to the inventive apparatus, and the steam generated during treatment of the milling product in the machine, such as grinding of the product between the grinding member 5 and the grinding element 16 on the force-exerting blocks 6 remains in the pocket and is blown out through the steam outlet conduit 11.

The described apparatus can function both as a steam separator and as a fiber material treator, therewith enabling the apparatus to be used separately or in combination with, for instance, defibrators in which the fiber material has been earlier treated.

Figure 4:
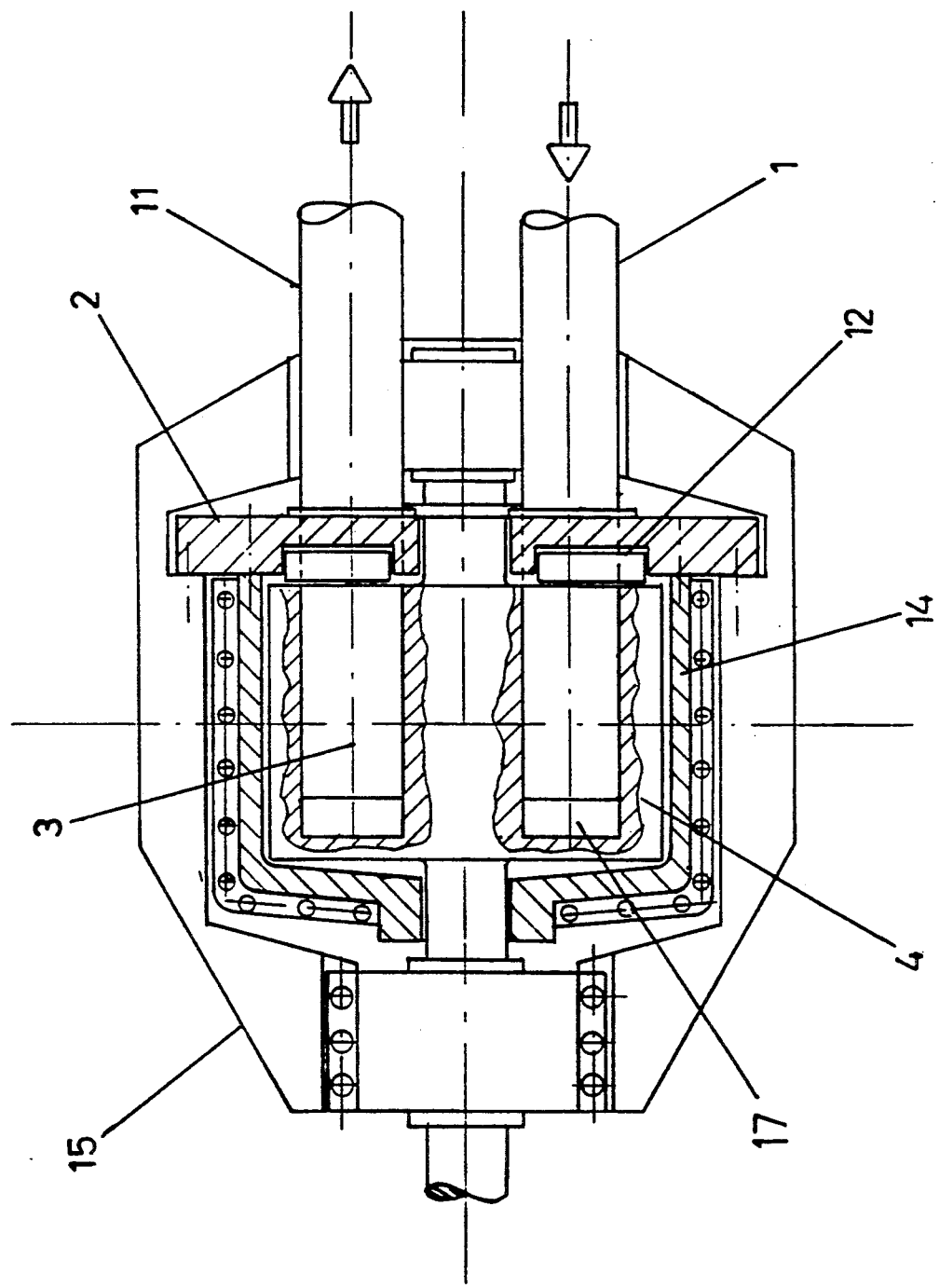
FIG. 4 is a sectional view corresponding somewhat to FIG. 3 showing a further modified embodiment.
Figure 5:
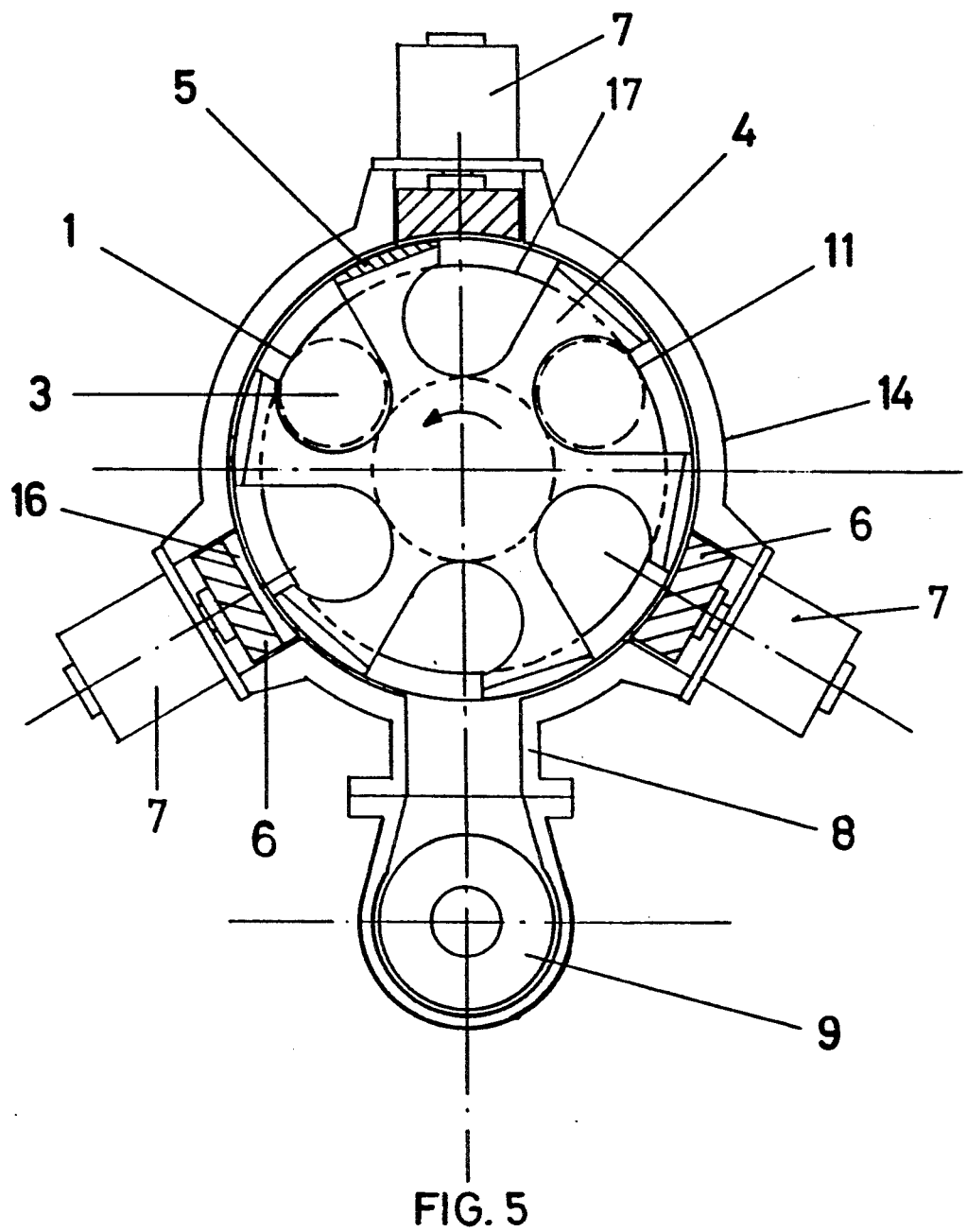
FIG. 5 is a horizontal sectional view of the embodiment shown in FIG. 4.

In the embodiment of FIGS. 4 and 5, in which corresponding parts have been denoted with the same reference numbers as those used in FIGS. 2 and 3, a chamber 17 mutually connects two or more of the pockets; in the illustrated embodiment the chamber connects mutually all pockets 3, at the rear end of the pockets. Apart from the inclusion of the chamber 17, the embodiment illustrated in FIG. 4 and 5 is the same as that illustrated in FIGS. 2 and 3.

I claim:

1. In an apparatus for the treatment of milling products having a steam content which includes a housing, a rotor rotatably mounted in the housing, at least one pocket oriented in the peripheral surface of the rotor, the pocket functioning to receive milling product to be treated and which is introduced into the housing through a milling product inlet, said housing further including a steam outlet, the inlet and outlet communicating sequentially with the pocket as the rotor rotates about an axis within the housing, the improvement comprising, a milling product discharge opening, the at least one pocket having a radially oriented discharge opening which, upon rotation of the rotor between the inlet and the outlet, is brought into open communication with said milling product discharge opening, said milling product discharge opening being located between the inlet and the outlet, a steam tight discharge means, said milling product discharge opening communicating with said steam tight discharge means whereby the milling product is thrown centrifugally through said discharge opening as the rotor rotates and thereafter the steam content of the at least one pocket subsequently discharged through the steam outlet.

2. The apparatus of claim 1 in which the milling product inlet and the steam outlet are arranged axially in relation to the rotor and are angularly disposed in relation to one another and in relation to said milling product discharge opening.

3. The apparatus of claim 1 in which the at least one pocket extends completely through the rotor, and the milling product inlet and the steam outlet are positioned on opposite sides of the housing.

4. The apparatus of claim 3 including a sealing ring means mounted between said common side of the housing and the rotor to thereby seal said common side of the housing with respect to the at least one pocket and the milling product inlet and the exhaust outlet, and means for axially adjusting said sealing right to thereby adjust the clearance between said common side of the housing and the rotor.

5. The apparatus of claim 4 including a plurality of pockets provided in spaced relationship and within the peripheral surface of the rotor.

6. The apparatus of claim 1 in which the at least one pocket is in the form of a closed aperture in the rotor and the milling product inlet and steam outlet are positioned on a common side of the housing.

7. The apparatus of claim 6 including sealing ring means mounted between said opposite sides of the housing and the rotor adjacent said milling product inlet and said steam outlet, and means for axially adjusting said sealing ring means with respect to the rotor to thereby adjust the clearance of the rotor with respect to said opposite sides of the housing.

8. The apparatus of claim 7 including a plurality of spaced pockets in the peripheral surface of the rotor.

9. The apparatus of claim 1 including a plurality of pockets provided in spaced relationship and within the peripheral surface of the rotor, each of said pockets having a radial opening therein.

10. The apparatus of claim 9 including at least one grinding plate means disposed between said radial openings of said pockets, said grinding plate means being mounted along the peripheral surface of said rotor.

11. The apparatus of claim 10 including at least one block means mounted within said housing and in opposing relationship with respect to said peripheral surface of the rotor, and means for urging said block means toward said peripheral surface of the rotor to thereby adjust to the clearance space between said block means and said grinding plate means.

12. The apparatus of claim 11 in which said block means has an outer face, a grinding member being mounted to said outer face of said block means for cooperatively engaging said grinding plate means.

13. The apparatus of claim 12 in which said pockets are substantially cylindrical in configuration and being defined having a first diameter, each of said milling product inlet and steam outlet having diameters equal to said first diameter.

14. The apparatus of claim 13 in which the milling product discharge opening is positioned further from the rotational axis of the rotor than is the steam outlet.

15. The apparatus of claim 13 including a chamber within said housing, said chamber communicating at least two of said pockets with respect to one another, said chamber being spaced remotely from said milling product inlet.

16. The apparatus of claim 1 in which said pocket is generally cylindrical having a diameter of a first dimension, said milling product inlet and steam outlet having diameters equal to said first dimension.

17. The apparatus of claim 1 in which said milling product discharge opening is spaced radially farther from the rotational axis of the rotor than is the steam outlet.

18. The apparatus of claim 9 including a chamber formed within said housing and spaced remotely from said milling product inlet, said chamber communicating with at least two of said pockets.

19. In an apparatus for the treatment of milling products having a steam content which includes a housing, a rotor rotatably mounted within the housing about an axis, a plurality of pockets provided in the peripheral surface of the rotor and functioning to receive milling product to be treated and wherein the milling product is rotated while steam is separated from the milling product, the housing further including a milling product inlet and a steam outlet which communicate sequentially with the pockets as the rotor rotates within the housing, the improvement comprising, a milling product discharge opening located through said housing between the milling product inlet and the steam outlet, a steam tight discharge means communicating with said milling product discharge opening, said plurality of pockets having radially oriented discharge openings which, upon rotation of the rotor between the milling product inlet and the steam outlet are brought sequentially into open communication with said milling product discharge opening whereby the milling product is thrown centrifugally through said radially oriented discharge openings into said milling product discharge opening as the rotor rotates after which steam from said pockets is subsequently discharged through the steam outlet, at least one grinding plate means mounted in the peripheral surface of said rotor and intermediate two of said pockets, at least one block means mounted within said housing and in opposing relationship to said peripheral surface of the rotor, means for urging said block means toward said peripheral surface of the rotor, and grinding means carried by said block means for engaging said grinding plate means of the rotor as the rotor rotates within the housing.

20. The apparatus of claim 19 including means for adjusting said block means relative to the rotor so as to adjust the spacing between said grinding means and said grinding plate means of the rotor.

21. The apparatus of claim 19 wherein the steam outlet and the milling product inlet are arranged axially in relation to the rotational axis of the rotor and are angularly disposed in relationship to one another and in relationship to said milling product discharge opening.

22. The apparatus of claim 21 in which each of said pockets extend through said rotor and the milling product inlet and the steam outlet are positioned on opposite sides of the housing.

23. The apparatus of claim 21 in which the pockets extend partially through the rotor and the milling product inlet and steam outlet are oriented in spaced relationship on a common side of the housing

* * * * *